Jan. 6, 1970  G. TOOBY  3,487,554
METHOD AND APPARATUS FOR DEHYDRATING MATERIALS
Filed Sept. 23, 1965  5 Sheets-Sheet 1

INVENTOR.
GEORGE TOOBY
BY
Christie, Parker & Hale
ATTORNEYS.

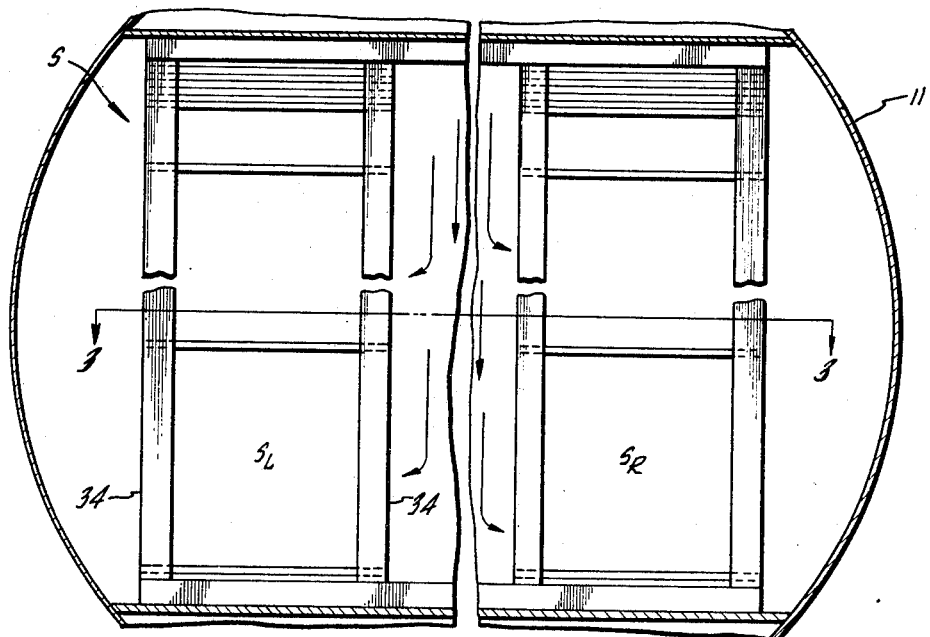
FIG_2
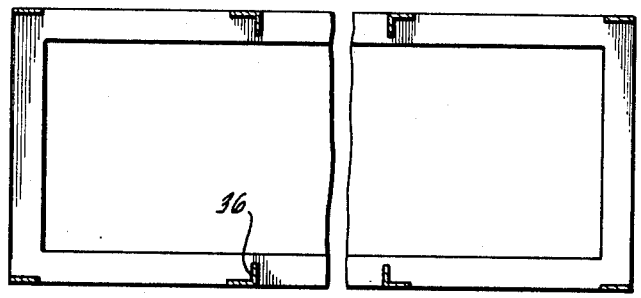
FIG_3
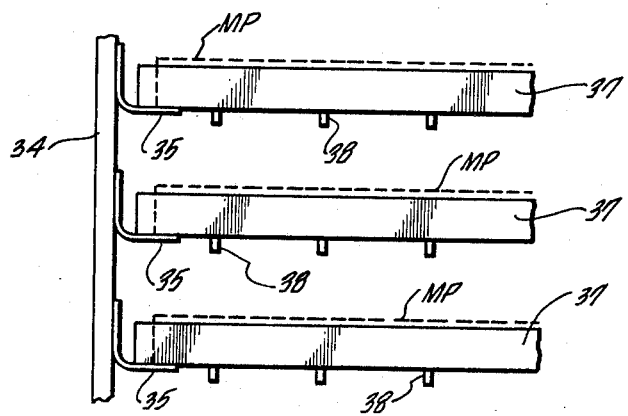
FIG_4
INVENTOR.
GEORGE TOOBY
BY
ATTORNEYS.

Jan. 6, 1970  G. TOOBY  3,487,554
METHOD AND APPARATUS FOR DEHYDRATING MATERIALS
Filed Sept. 23, 1965  5 Sheets-Sheet 3
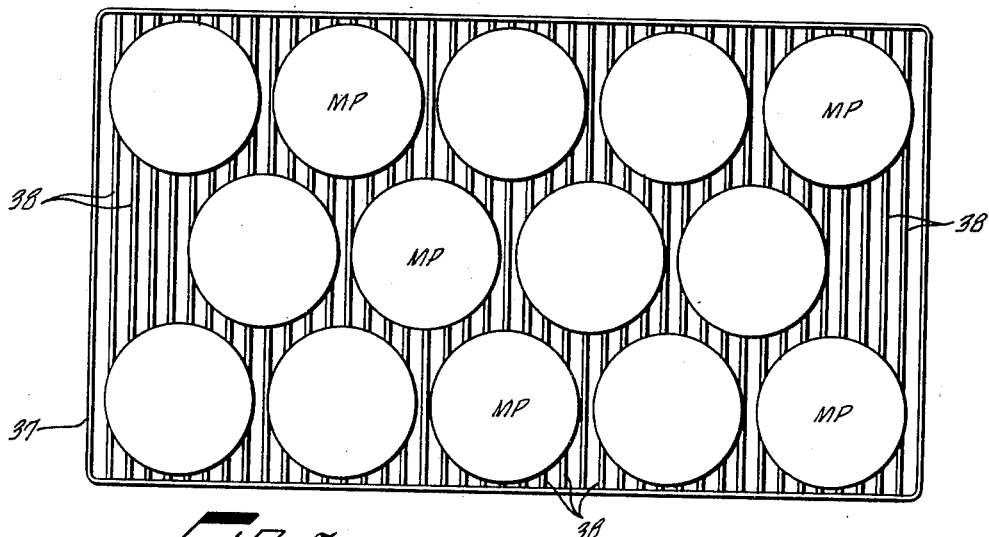
FIG. 5.
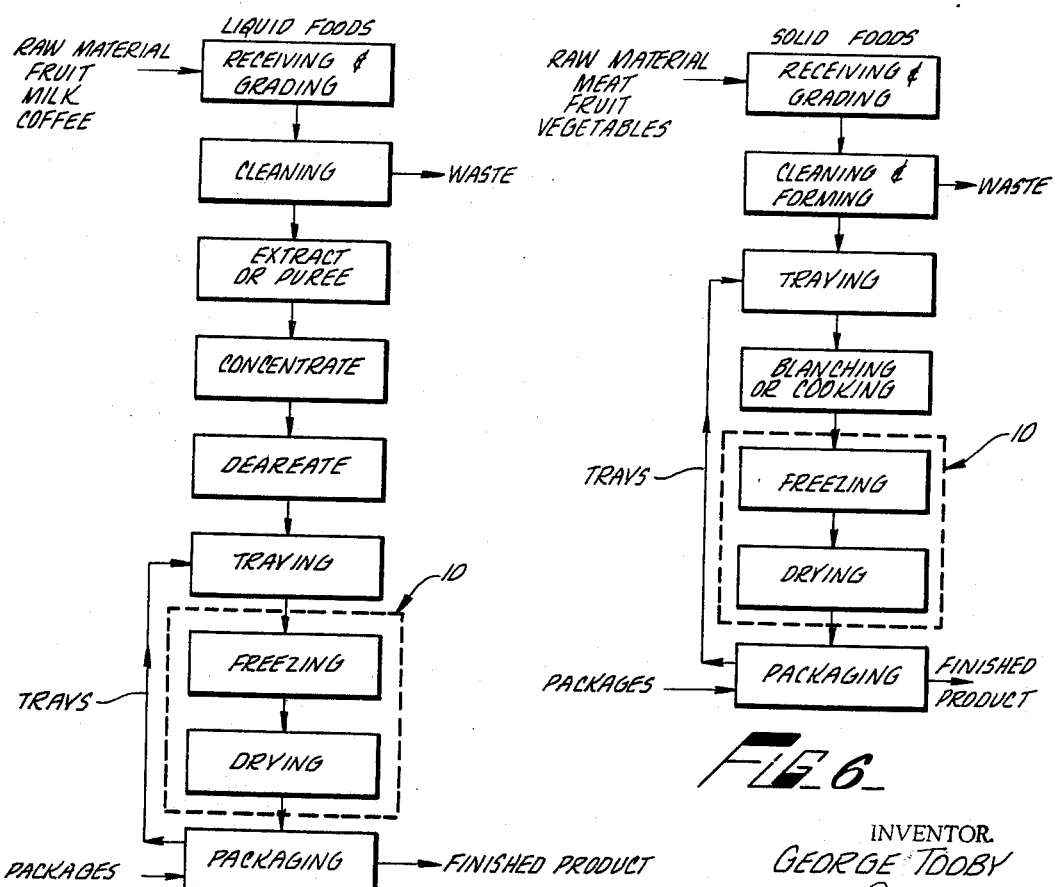
FIG. 6.
FIG. 7.
INVENTOR.
GEORGE TOOBY
BY
Christie, Parker & Hale
ATTORNEYS.

Jan. 6, 1970　　　　　G. TOOBY　　　　　3,487,554
METHOD AND APPARATUS FOR DEHYDRATING MATERIALS
Filed Sept. 23, 1965　　　　　　　　　　5 Sheets-Sheet 4

INVENTOR.
GEORGE TOOBY
BY
Christie, Parker & Hale
ATTORNEYS.

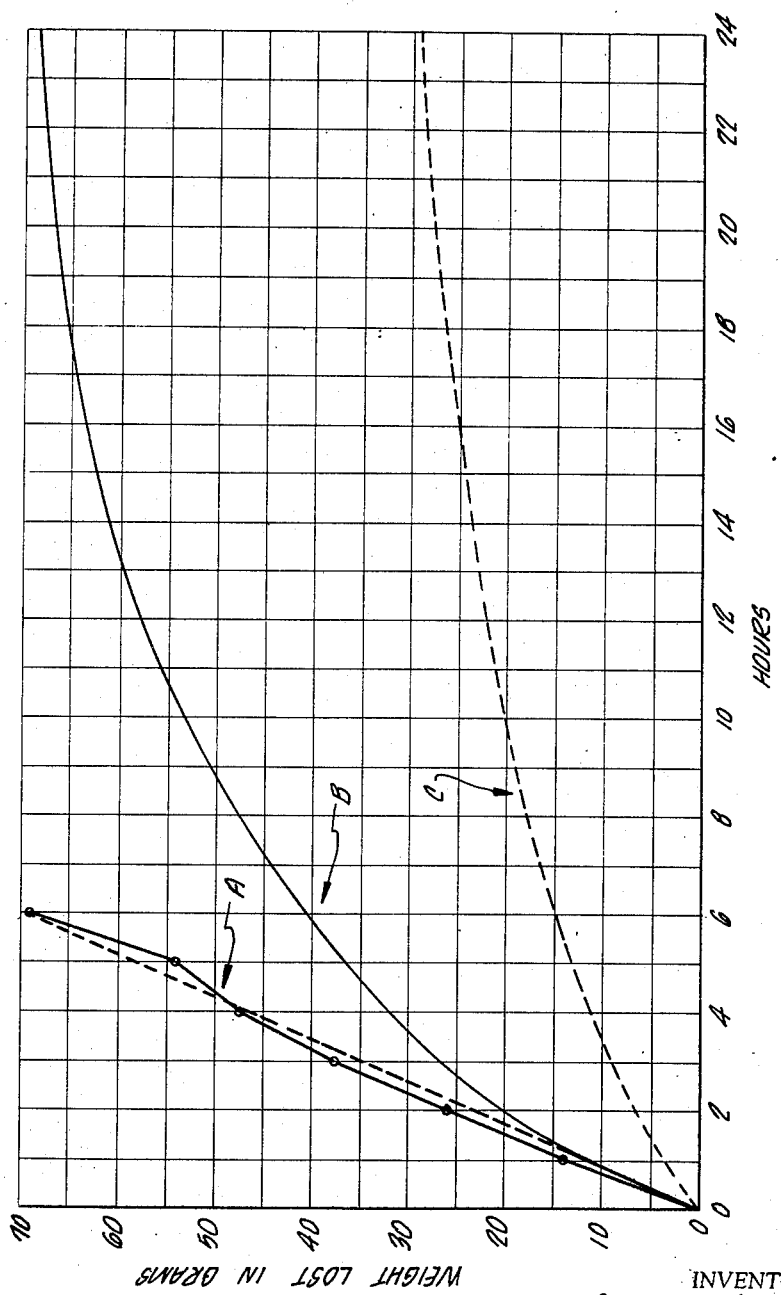

United States Patent Office 3,487,554
Patented Jan. 6, 1970

3,487,554
METHOD AND APPARATUS FOR DEHYDRATING MATERIALS
George Tooby, 1135 Circle Drive,
San Marino, Calif. 91108
Filed Sept. 23, 1965, Ser. No. 489,515
Int. Cl. F26b 5/06
U.S. Cl. 34—5                                          20 Claims

ABSTRACT OF THE DISCLOSURE

A method and apparatus for freeze drying heat sensitive materials. The method comprehends freezing a product to be dried and providing the heat of sublimation to the product by means of an inert dry gas, such as hydrogen, by passing the gas over the product at controlled temperatures, pressures and velocities to maintain a balance between the rate of heat transfer and rate of diffusion of the liquid from the product in balance to cause the product to dry uniformly.

---

This invention relates to a method and apparatus for dehydrating materials and in particular to an improved method and apparatus for freeze drying materials.

Materials are commonly dehydrated by one of three methods. One method is to evaporate water from the surface of the material being dehydrated by blowing a gas, usually air, across the surface of the material so that the gas stream provides heat to evaporate the water and at the same time removes the vaporized water molecules from the surface of the material. A second method is to apply heat to the material being dehydrated through conduction, as for example from metal tubes, drums or shelves, and remove the water evaporated from the surface by means of a gas stream. Both of these methods are usually practiced at atmospheric pressure. Such dehydration greatly alters the properties of the material being dried as a result of the high temperatures at which the evaporation takes place and as a result of the long time period required for such dehydration.

A third method of dehydrating materials is commonly known as freeze drying. The art of freeze drying of materials to remove the liquid therefrom has been known for a number of years. The method involves subliming water from material at absolute pressures of 1 millimeter of mercury or below where the heat is provided by conduction from heated metal or by radiation or by a combination of both. This application of heat to a frozen product causes the frozen liquid or frozen water therein to sublime and thereby dehydrates the material. One such freeze drying technique is described in U.S. Patent No. 2,435,503.

In general, the freeze drying apparatus that has been developed and employed to date has the advantage of maintaining the material undergoing drying at a temperature below the freezing temperature of the liquid or water therein. In order to practice these freeze drying methods, however, the heat required for the sublimation of the liquid has been provided by conduction by means of contact with heated plates and then transferring the expelled vapors to condensing apparatus by means of diffusion. The sublimation and condensation of the liquid must be accomplished at very low pressures, less than one millimeter of mercury. The cost of constructing this low vacuum freeze drying apparatus and the cost of providing the energy for operating at such high vacuums is very high. The drying cycle for such freeze drying vacuum chambers may be on the order of twenty-four hours and, accordingly, the unit costs for the articles undergoing drying is also very high. A portion of this expense is due to the fact that about 25 percent of the drying takes place in the first 5 percent of the drying cycle and 50 percent of the drying takes place during the first 15 percent of the drying cycle. Thereafter, the liquid or water removed from the product is removed at a decreasingly slower and very slow rate. Further disadvantages of the presently known freeze drying apparatus is that the article undergoing drying must be prepared in very thin sections on the order of $3/16$ of an inch thick or the article must be clamped to maintain it at a pressure for reducing the drying time to increase the efficiency and unit cost. Prior art freeze drying methods do not allow for ready determination of when the final and desired moisture content has been reached in the product undergoing drying. Thus, present day freeze drying apparatus and/or techniques require long drying times, complicated heat transfer equipment, specialized or uniform sizes of material of very thin cross-section for drying and present difficulties in determining the actual moisture content of the material and, in general, do not produce materials that are uniformly dried throughout.

The present invention provides an improved method and apparatus for freeze drying a material that is much less expensive to operate than prior art freeze drying techniques and lends itself to continuous operation. The method of the present invention also produces a dehydrated product that is superior in quality from present day dried products in that the basic properties of the article are not changed by the dehydration. To this same end, a food product dried in accordance with the teachings of the present invention may be considered to be readily palatable as contrasted with presently available products dried by freeze drying. Food products dried in this manner rehydrate in a shorter period of time and more completely than do presently available products dried by freeze drying.

The drying method of the present invention produces a superior dried product in that the method of drying produces a uniform and complete drying of the product that is essentially linear with time. The freezing of the product is controlled to produce ice crystals throughout and thereby producing capillaries throughout the product upon sublimation of the ice crystals and then controlling the temperature of dehydration to preserve the thus defined capillaries whereby the article may be quickly and completely rehydrated to essentially the same character as before dehydration.

The unexpected results of the teachings of the present invention are based on the fact that if a product, any heat sensitive product, is carefully frozen to optimize ice-crystal size, and therefore leaving capillaries when the ice is sublimed, and then subjecting the frozen product to a high velocity flow of a warm, dry, inert gas at a reduced pressure, said pressure being about one-tenth of an atmosphere and about fifty times as great as the pressure used in previously practiced freeze drying, it will dry rapidly and at a constant rate, without thawing, to produce a dehydrated product which rehydrates quickly and completely. Under these controlled conditions the product maintains itself at a temperature substantially below the temperature of the gas stream and will not thaw if carefully protected so that it receives heat ony from the gas stream and not by radiation or conduction from other heat sources.

Broadly, the method of dehydration of the present invention comprehends the steps of controllably freezing a product to be dried to produce ice crystals of a size for defining capillaries throughout the product when the ice crystals are sublimed. The thus frozen product is subjected to an inert, dry gas of a preselected temperature at a reduced pressure and at a velocity to produce a balance between the heat transfer rate and the diffusion rate whereby the ice crystals are sublimed while simultaneously preserving the capillaries defined by the ice crystals and simultaneously carrying away the vaporized fluids from the surface of the product without allowing the frozen product to thaw.

Specifically, the method of freeze drying of the present invention includes the provision of a cylindrical drying chamber that is adapted for both freezing a product undergoing drying and freeze drying the product. The drying chamber includes a portion adapted to store a product and passed thereover at a velocity to cause the sublimation thereby heat transfer from the supporting structure to allow the product to be subjected to the freezing and drying gases as completely as possible without altering the characteristics of the product due to heat received from the supporting structure. To this end, the product stored within the drying chamber is subjected to a controlled cold stream of an inert gas, such as nitrogen, to freeze the product including the liquid or water within the product. The freezing is controlled to produce ice crystals throughout for defining capillaries upon sublimation of the ice crystals. The nitrogen gas is then exhausted from the drying chamber and the exhausted chamber is filled with an inert dry gas, such as hydrogen, introduced therein at a sub-atmospheric pressure within the range of 20 to 80 millimeters of mercury, absolute pressure, and at a preselected velocity. The temperature of the gas is proportioned to provide the heat of sublimation to the product and passed thereover at a velocity to cause the sublimation vapors to be simultaneously carried away. Specifically, the temperature of the hydrogen gas and the velocity with which it is passed over and in contact with the product undergoing drying are proportioned to maintain the rate of heat transfer and the rate of diffusion of the liquid in balance to cause the product to dry uniformly, completely and linearly with time. The internal temperature of the product during the drying period is by this means controlled to not only preserve the basic product characteristics but also the capillaries defined during freezing.

One specific and successful application of the method and apparatus of the present invention is the dehydration of a ground meat patty of approximately 4½ inches in diameter and ⅜ of an inch thick that was uniformly and completely dried in approximately six hours and wherein the internal temperature of the meat patty did not exceed 20 degrees Fahrenheit during the drying cycle until 75 percent of the moisture had been evaporated. The dehydrated meat patty rehydrated rapidly and completely and was found to be very palatable having maintained all of its basic charcteristics.

These and other features of the present invention may be more fully appreciated when considered in the light of the following specifications and drawings in which:

FIG. 2 is a vertical elevational view of the storage section of the drying chamber of FIG. 1;

FIG. 3 is a cross-sectional view taken along the line 3—3 in FIG. 2 and showing the relationship of the product (meat patty) in dotted outline;

FIG. 4 is a partial, elevational view of the storage section of the drying chamber, as illustrated in FIG. 2 and showing the product storage trays in storage;

FIG. 5 is a top plan view of a storage tray with a product to be dried positioned thereon prior to storage in the drying chamber;

FIG. 6 is a block diagram of a typical procedure for processing solid foods in accordance with the present invention;

FIG. 7 is a typical procedure for processing liquid foods in accordance with the present invention.

FIG. 9 is a graphical illustration of the comparative weight loss in grams with time for the present invention and prior art techniques.

Figure 1:
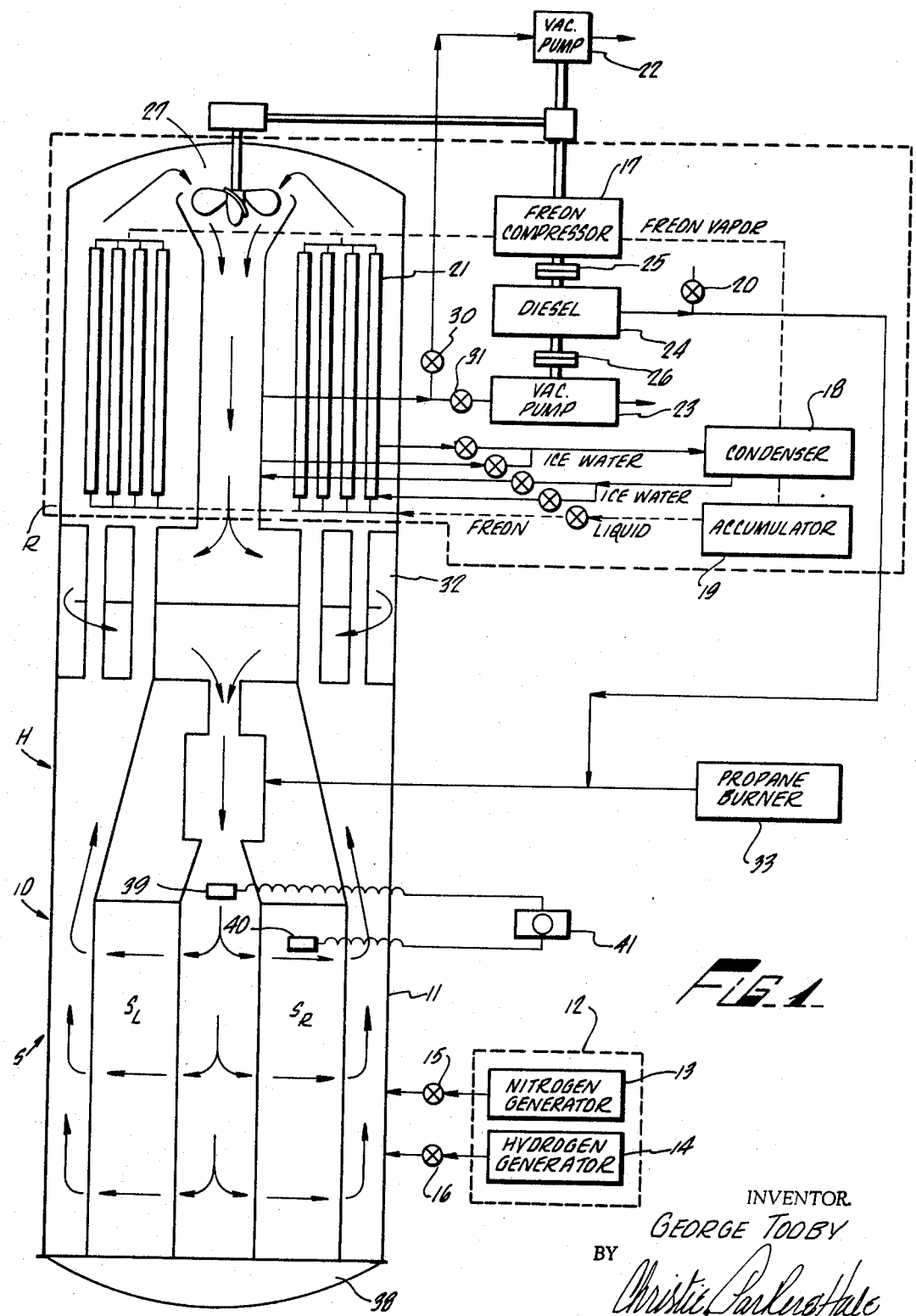
FIG. 1 is a diagrammatic illustration of a horizontal sectional view of a drying chamber and the associated apparatus embodying the present invention.

Now referring to the drawings, a detailed examination of the method and apparatus for dehydrating in accordance with the present invention will be described. The method can best be understood by first examining an exemplary drying chamber for carrying out the method of dehydration diagrammatically illustrated in FIG. 1.

The drying chamber 10 broadly comprehends a generally, cylindrical metallic shell 11 capable of withstanding an external pressure of one atmosphere. The drying chamber 10 can be considered to be divided into a cooling or refrigeration section R, a heating or heat exchange section H and a product storage section S for storing the product to be dried. The drying chamber 10 includes a source of gas 12 coupled thereto for freezing and drying a product. The gas source 12 is diagrammatically illustrated in block form and includes a pair of individual gas generators shown as the nitrogen gas generator 13 and the hydrogen gas generator 14. Each of these generators 13 and 14 are controllably coupled to the drying chamber 10 by means of individual control valves 15 and 16 for controlling the entry of the respective nitrogen and hydrogen gases into the chamber.

The drying chamber 10 is defined with the aforementioned three sections and a central or axial passageway through the drying chamber to allow the gas introduced therein to be conveyed horizontally through each of the sections. The drying cylinder is further defined to allow the entrapped gas to circulate outside of the axial passage to the outer walls of the chamber through the storage section S. The gas then passes backward through the sections S, H and R, in the reverse direction, in the passageway defined between the outer walls of the shell 11 and the walls defining the central passageway. In this fashion, the freezing or drying gas introduced into the chamber can be successively passed through the refrigeration section R, the heat exchange section H and the product storage section S whereby its temperature is successively modified and then recirculated back through in the reverse order to again be successively modified, in the reverse order.

The refrigeration system for cooling the gas entrapped in the drying chamber 10 comprises a Freon compressor 17, a condenser 18 and an accumulator 19. These elements coact with the three-section ice accumulator and water cooler 21 arranged within the drying chamber 10 proper, the refrigeration section R. To this end, the ice accumulator and water cooler 21 is arranged around the axial passage for the drying chamber 10 and adjacent the uppermost section of the chamber to allow the gas to circulate therethrough and back into the axial passageway, as illustrated. The cycle of the refrigeration system can be best appreciated from examining FIG. 1 wherein it is seen that the Freon vapor from the compressor 17 is circulated to the condenser 18 and the ice water produced in the refrigeration section R is therein used to condense the Freon vapor to liquid. The ice water is circulated through the ice accumulator and back to the condenser 18, as illustrated. In addition, the condenser 18 is coupled to the accumulator 19, the accumulator providing the Freon liquid to the ice accumulator and water cooler 21.

Along with the refrigeration system there is provided a vacuum pump for exhausting the drying chamber and maintaining a preselected sub-atmospheric pressure therein. For this purpose, a pair of vacuum pumps 22 and 23 are provided. The vacuum pump 22 is a small capacity pump and is provided to maintain the reduced pressure within the drying chamber 10 after it has been evacuated to a desired pressure by means of the large capacity vacuum pump 23. The vacuum pumps 22 and 23 are coupled to the drying chamber by means of individual control valves 30 and 31 for respectively coupling the small vacuum pump 22 and the large vacuum pump 23 to the drying chamber for evacuating it to the desired pressure. The control valves 30 and 31 are illustrated as coupled to a common line to the central axial passageway. Both of the pumps 22 and 23 are exhausted to the atmosphere.

To circulate the gas within the chamber 11 through the three sections a fan 27 is provided and mounted to an end of the refrigeration section R of the drying chamber 11 opposite the entrance to the axial passageway.

The vacuum pumps 22 and 23 and the compressor 17 are powered in this instance by means of a diesel engine 24 having its drive shaft coupled to drive the Freon compressor 17. The engine 24 is also arranged to drive the small vacuum pump 22 in tandem with the compressor 17. The diesel engine 24 is also coupled in common with the drive for the pump 22 to drive the fan 27. The engagement of the clutch 25, then, causes the operation of the compressor 17, pump 22 and fan 27. The engine 24 has its drive shaft coupled to drive the large capacity vacuum pump 23 through the clutch 26. The clutches 25 and 26 are alternately engaged. The exhaust air from the diesel engine 24 may be evacuated directly to the atmosphere by means of the control valve 20 or circulated to the heat exchange section H of the drying chamber 10, as will be described more fully hereinafter.

The operation of the refrigeration system and the vacuum system is such that either the clutch 25 or 26 is in engagement to operate one of the vacuum pumps 22 or 23 and, accordingly, one of the control valves 30 or 31 is opened to evacuate the drying chamber 10 to the desired pressure prior to the introduction of the inert gas therein, or to maintain the entrapped gas at the desired pressure.

The stream of gas in the axial passage leaving the refrigeration section R passes through the axial passage of the drying chamber into the heat exchange section H. The heat exchange section H admits the gas from the refrigeration section R through the regenerator 32 and allows it to pass into the product storage section S. The axial passageway at the regenerator 32 is enlarged in volume from the passageway through the refrigeration section R. The exit passageway from the regenerator 32 is reduced for a small length to admit the gas into the heater proper passageway. The heater section H is heated by means of a propane burner 33, for example, that may be controlled in a conventional fashion to produce the desired temperature for the circulating gas. This heating may be supplemented by the exhaust gases from the diesel engine 24 through the operation of the valve 20 and by means of a conduit connected in common therewith, as diagrammatically illustrated. In this fashion, the cold gas leaving the refrigeration section R enters the regenerating section 32 and is partially heated by the product exposed gas circulating rearward adjacent the outer walls to the refrigeration section R. The partially heated gas attains its final drying temperature in the heating section proper to cause the sublimation of the ice in the frozen product. The thus heated gas is then conducted to the product storage section S.

The storage section S is diagrammatically illustrated as a pair of storage sections $S_L$ and $S_R$ in FIG. 1 and the sections each include a plurality of vertically defined storage shelves for accepting trays storing the product to be dehydrated.

The storage section S can be best appreciated by examining FIGS. 2, 3 and 4. The storage section S comprises the pair of substantially identical sections $S_L$ and $S_R$ and, therefore, only one need be examined in detail. The axial gas passageway is defined between the sections $S_L$ and $S_R$.

The storage section S including the storage trays are constructed and defined so as to minimize any interference to the gas flow through the storage section and across the surface of the stored product. Furthermore, the tray storing the product undergoing drying are constructed and defined to minimize any transfer of heat from the material, in this instance the metal, from which the trays storing the product undergoing drying are conproduct undergoing drying. The significance of this is that the heat transfer to the product undergoing drying is solely by means of the drying gas and, therefore, affords better control of the drying.

The storage section proper $S_L$ is defined with upstanding, spaced apart supporting members 34 defining an open frame. When the drying chamber is arranged in a horizontal plane, the storage sections $S_L$ and $S_R$ may extend from floor to ceiling, as illustrated in FIG. 2. The members 34 have angle members 35 connected thereto and vertically spaced apart a predetermined distance to allow a tray to be inserted thereon and allow the freezing and drying gas to freely circulate therethrough. In addition to the angle members 35 connected to each of the supporting members 34, there are provided similar angle members 36 longitudinally spaced a preselected distance apart between the supporting member 34 to support the trays in the storage sections.

The trays for storing the product to be dehydrated are shown in FIGS. 4 and 5 and are identified by the reference character 37. To provide the desired minimization of heat transfer to the stored product from metal the trays 37 are defined with an apertured bottom wall that allows the gas to circulate therethrough. To this end, the bottom supporting wall comprises a plurality of spaced apart supporting rods 38, as best appreciated from examining FIG. 5. When the product undergoing drying is a conventional meat patty, MP, the patties are arranged on the tray 37 to maximize the exposure of the meat patties to the gases. They may then be arranged in the pattern illustrated in FIG. 5, although not necessarily spaced apart. The trays 37 are further defined with upstanding wall portions of such depth to prevent the article undergoing drying to slide off of the tray during storage or removal to and from storage and more importantly to support the product without interrupting the gas flow across the top and bottom surfaces thereof; see FIG. 4.

Once the product to be dried is stored on the trays 37, as described, it is introduced into the drying chamber 10 by means of the door 38 hinged to the front end of the drying chamber 10, as illustrated in FIG. 1.

An important feature of the present invention is the control of the internal temperature of the product undergoing drying during the drying cycle. To this end, this temperature is indicated or recorded by sensing the temperature of the heated gas in the axial passageway upon entering the storage section S and simultaneously the internal temperature of the product undergoing drying and determining the difference. It has been determined that this difference temperature is an indication of the amount of water remaining in the product undergoing drying. For this purpose, a resistance thermometer 39 is supported in the gas stream in the axial passage for the drying chamber 10 at a location immediately prior to the gas entering the storage section and being subjected to the frozen product undergoing drying. In the same fashion, the temperature of the product undergoing drying is determined by the provision of a resistance thermometer 40 positioned in the center of the product or the meat patty MP. These two thermometers 39 and 40 are electrically connected through a recording bridge circuit 41, diagrammatically illustrated in block form, to provide the accurate and continuous record of the desired temperature difference or the amount of moisture remaining in the product.

With the above structure of the drying chamber in mind, the general procedure for dehydrating a product will now be examined. It should be appreciated that the method and apparatus of the present invention is adaptable to any heat sensitive product including both solid and liquid foods.

An important feature of the dehydration method is the controlled freezing and drying in accordance with the present invention that produces a dehydrated product having superior qualities from any presently known, commercially available dehydrated product. It is thought that the improved dried product results by controllably freezing a product to produce ice crystals that are dispersed throughout the product to cause capillary channels to be defined once the ice crystals are sublimed. The thus frozen product is dehydrated by controlling the drying thereof to preserve the capillaries defined by the ice crystals upon sublimation whereby the completely dehydrated product will have all the minute capillaries dispersed throughout. The importance of this capillary structure is that the product may be rehydrated very quickly and completely by the capillary action afforded by these capillary channels. Heretofore, such capillaries were subsequently filled or altered by melted fat or other materials deposited when the product was excessively heated during drying. It has been found that a dehydrated meat patty may be rehydrated completely by immersion in cold water in approximately five minutes or less. It should also be appreciated that a dehydrated meat patty produced from the method of the present invention does not have its basic properties or coloration changed as a result of the drying and may not be readily distinguishable from an undried meat patty.

To initiate the dehydration procedure, the product to be dried must be properly processed. FIGS. 6 and 7 show in block diagram form the processing operations that may be employed in a commercial process utilizing the present invention. FIG. 6 shows the various processing steps for freeze drying a solid food such as meat, fruit or vegetables. It will be seen that the solid food is first graded, cleaned and formed into the particular shape or condition desired, placed on a storage tray and blanched or cooked, if desired, prior to introduction to the drying chamber. Upon completion of the drying, the dehydrated product is packaged and ready to be shipped for final usage. The product may be packaged in an atmosphere of nitrogen by means of a hermetically sealed container for later use.

When a liquid food is to be dehydrated by means of the present invention, the same general steps as outlined for a solid food may be employed, as shown in FIG. 7. The liquid foods such as a fruit, milk or coffee are cleaned, graded and preferably are concentrated and deaerated before being subjected to the drying chamber 10. It will be appreciated that certain of these procedures may be eliminated or other procedures added to produce the desired, final dehydrated product.

Although the present invention is applicable to various products, it will now be described in terms of dehydrating a meat patty. It will be assumed that the meat patty consists of raw, ground beef of a conventional grade and has been formed into a patty of approximately 4½ inches in diameter and ⅜ of an inch thick. These meat patties, MP, are then placed on the storage trays 37, as illustrated in FIG. 5. The trays 37 storing the meat patties, MP, are then introduced into the drying chamber 10 through the open door 38 and stored in the storage sections $S_L$ and $S_R$. The thermometer 40 is then inserted into the center of the meat patty, MP, after which the door 38 is closed and clamped shut to provide a gas tight chamber.

To initiate the dehydration procedure, the diesel engine 24 is started and its exhaust valve 20 is operated to cause its exhaust to be vented directly to the atmosphere through the valve 20. With the operation of the diesel engine 24, the clutch 26 is engaged to cause the large capacity vacuum pump 23 to be placed into operation. The vacuum pump 23 will exhaust the drying chamber to an absolute pressure of approximately 5 millimeters of mercury in about ten minutes. The drying chamber 10 is exhausted in this fashion to remove the air and, more particularly the oxygen, from the interior of the drying chamber to minimize any oxidation of the product undergoing drying or the meat patty, MP. After the drying chamber is exhausted to the desired pressure, the clutch 26 is disengaged to stop the vacuum pump 23. At this time, the control valve 15 for the nitrogen generator 13 is opened to introduce the nitrogen gas into the drying chamber 10 and to fill the chamber with a dry, oxygen free nitrogen to substantially atmospheric pressure. After the drying chamber 11 is filled with the inert nitrogen gas, the clutch 25 is engaged and thereby simultaneously places in operation the Freon compressor 17, the low capacity vacuum pump 22 and the fan 27. The Freon compressor 17 coacts with the condenser 18 and the accumulator 19 and the ice accumulator and water cooler 21 to chill the inert dry nitrogen in the chamber. The nitrogen gas is preferably chilled to a temperature on the order of 20 degrees Fahrenheit. The pump 22 and the valve 30 will maintain the gas at the preselected pressure. With the operation of the fan 27, the nitrogen gas is circulated at a high velocity, on the order of 500 feet per minute, throughout the drying chamber 10, as described. This gas velocity may be provided by any conventional means including controlling the speed of the diesel engine. This stream of cold nitrogen is blown or conveyed over the meat patty, MP, for approximately thirty minutes to cause any fluid or moisture in the patty, MP, to be frozen into ice crystals. The temperature and velocity for the nitrogen gas have been selected to produce the aforementioned controlled freezing to cause the ice crystals to form completely throughout the meat patty, MP, for defining the capillary channels upon sublimation of the crystals.

After the meat patty, MP, is subjected to the cold stream of nitrogen gas for thirty minutes, the clutch 25 is disengaged and the clutch 26 is engaged to operate the vacuum pump 23 for evacuating the drying chamber to a pressure on the order of five millimeters of mercury.

The nitrogen gas may be considered as the freezing gas and has been selected in this instance for freezing the meat patty, MP, since it is essentially oxygen free and will not readily oxidize the meat patty. Accordingly, any other inert gas including hydrogen may be employed for this purpose. To the same end, when a product that is not readily oxidizable when subjected to oxygen is to be dehydrated, air may be employed. It has been found that the use of hydrogen gas has an increased rate of drying relative to nitrogen and, therefore, is preferable for the drying cycle of the dehydration method of the present invention. Again, it should be appreciated that except for the oxidation and slower rate of drying, air could be used for the freeze drying method of the present invention.

Once the drying chamber 10 has been evacuated, it is filled with hydrogen from the source 14 by the operation of the hydrogen control valve 16 to introduce the hydrogen into the chamber 10. Once the hydrogen is introduced into the chamber, the clutch 25 is engaged to start the refrigeration system, the fan 27 and the small vacuum pump 22. At this time, it is desired to maintain the hydrogen gas at a sub-atmospheric pressure on the order of 38 millimeters of mercury. Consistent with the desire to produce a dehydrated product having substantially the same characteristics and appearance as before drying, the amount of oxygen present within the drying chamber 11 should be maintained to no greater than two percent of the quantity of hydrogen gas therein. With the operation of the refrigeration system, the hydrogen gas is cooled to approximately minus 40 degrees Fahrenheit to freeze any water vapor in the hydrogen stream and thereby prevent the hydrogen stream from carrying the vapor to the product undergoing drying. It should now be appreciated that a stream of very dry, inert hydrogen having a temperature of minus 40 degrees Fahrenheit leaves the ice accumulator 21 and enters the regenerator 32 of the heat exchange section H of the drying chamber 10. The hydrogen stream upon entering the regenerator 32 is heated to approximately 15 degrees Fahrenheit. This heated hydrogen stream, then, enters the heater section of the heat exchange section H wherein it is further heated by means of the propane burner 33 (and the exhaust from the diesel engine) to a temperature of 80 degrees Fahrenheit. This heated, dry gas is then conveyed through the storage section S and passed over the meat patties, MP, stored on the trays 37.

The temperature of the hydrogen stream has been selected to cause the ice crystals formed therein to sublime. In addition, the velocity of this gas stream has been selected to place in balance the heat transfer rate due to the heated gas and the diffusion rate to allow the fluids of vaporization resulting from the sublimation to be simultaneously carried away from the surface of the meat patty, MP. The other aspect of this drying procedure is that the product is so controlled that it keeps itself frozen through its high rate of evaporation. This maintenance of the product in the frozen state is assured by the provision of the supporting trays and the structure of the storage sections to cause the product to receive heat solely from the drying gas. This includes the prevention of heat transfer to the product from radiation through the shell 11, the storage structures, as well as conduction from the supporting structures. It should also be noted that the use of hydrogen at the disclosed pressures, temperatures and velocities has been found to be at least twice as effective as the other inert gases including nitrogen and, therefore, thought preferable. As a result of being conveyed through the storage section S the hydrogen stream is cooled to a temperature of about 30 degrees Fahrenheit. This hydrogen stream passes back along the inner walls of the drying chamber 10 back to the refrigeration section R. At the regenerator 32, this hydrogen stream is further cooled to approximately minus 20 degrees Fahrenheit due to the exposure from the very cold hydrogen stream leaving the refrigeration section R. From the regenerator 32, the gas flows through the refrigeration section R wherein it is again cooled and recirculated through the axial passageway. The drying chamber 10 is operated in this drying cycle for approximately one hour.

An important aspect of the method of the present invention is the control of the internal temperature of the product undergoing drying, in this instance, the meat patty. It is important to control the internal product temperature to preserve the capillaries defined by the sublimed ice crystals. Accordingly, in terms of the meat patty under consideration, the internal temperature is governed by the lowest temperature at which the beef fat will melt. This upper limit has been determined to be 80 degrees Fahrenheit and accordingly the meat patty, MP, is never heated above the 80 degrees while the interior of the meat patty is not allowed to rise above 25 degrees Fahrenheit until the moisture in the product has been reduced below a critical value of about 22 percent moisture. To maintain the desired temperatures, after the initial phase of the drying cycle, it is necessary to reduce and control the temperature of the drying gas. This is done by regulating the amount of heat supplied the heater proper from the diesel exhaust and the propane burner 33.

Figure 8:
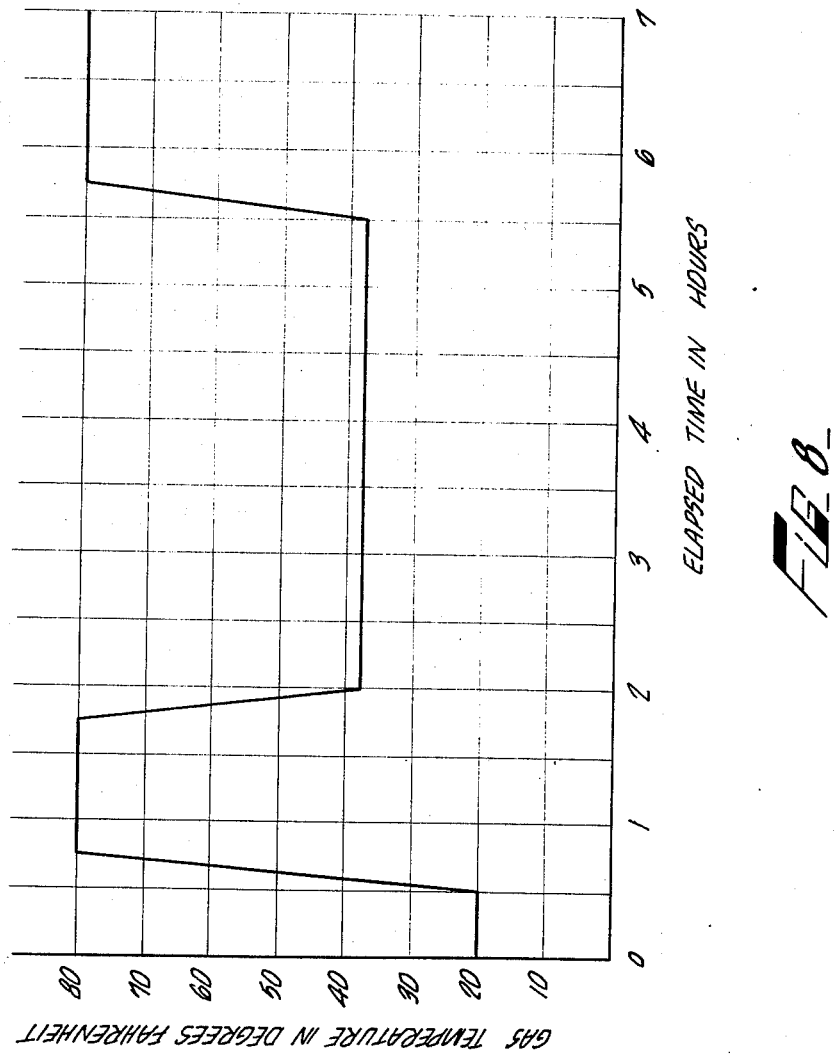
FIG. 8 is a graphical illustration of the gas temperatures within the drying chamber for the dehydration procedures.

This cycle of drying can best be appreciated from the graphical representation illustrated in FIG. 8 which shows the gas temperature of the gases in the drying chamber, including the freezing gas with time. From this graphical illustration, it will be appreciated that after operating the system at the initial drying gas temperature (80 degrees) for approximately one hour, the gas temperature is reduced to 38 degrees Fahrenheit. The reduction of the temperature of the gas entering the storage section S will also automatically maintain a balance of the temperature throughout the rest of the drying chamber 10, in view of the laws of heat balance and transfer. The drying cycle continues at this reduced drying gas temperature for approximately 3½ hours. At the end of this interval, the meat patty, MP, should be sufficiently dried whereby the water or liquid remaining in the meat patty is below the level wherein heating of the product would not change the basic properties thereof. Accordingly, to complete the dehydration as rapidly as possible the drying gas is increased in temperature to its initial drying temperature of 80 degrees Fahrenheit. At the end of approximately 1½ hours the meat patty, MP, will have obtained its desired degree of dryness and the dehydration cycle will have been completed. It will then be seen that the complete dehydration of the meat patty of FIG. 6 will require approximately seven hours.

It should be recognized that the complete dehydration of the meat patty, MP, is determined from the recording bridge 41, since it measures the temperature difference between the temperature of the hydrogen stream entering the storage section and the temperature of the center of the meat patty.

After the dehydration is completed, the diesel engine 24 is stopped and the drying chamber 10 is filled, once again, with nitrogen from the generator 13. After this operation, the door 38 may be opened and the storage trays 37 with the dehydrated products thereon removed from the chamber.

An important economic aspect of the present invention is that the dehydration is essentially linear with time. This, of course, not only reduces the amount of time required for dehydration, but also renders it more economically feasible if essentially the same amount of moisture is withdrawn for each increment of time whereby the operating equipment is operated more efficiently, and can be smaller.

FIG. 9 is a graphical representation of the number of grams of water lost by a 110 gram ground meat patty plotted against the time elapsed in hours over the drying cycle. The meat patties under consideration were each determined to have an initial sixty-three percent moisture content. Curve A in the graphical illustration has been developed through the use of the dehydration procedure of the present invention. Curve B is a representation derived by a conventional prior art, high vacuum freeze drying procedure, while curve C has been derived through a dehydration procedure wherein air is blown over the meat patty.

It will be seen from examining curve A that the drying is essentially linear with time. Also, during the first hour of dehydration approximately 14 grams of water were evaporated from the meat patty and that this rate has been maintained at a substantially constant value for six hours. At the end of the six hour drying interval the final moisture content of the meat patty was two percent. In using the prior art vacuum drying technique as represented by curve B, it will be seen that approximately 14 grams of water were evaporated during the first hour of operation, as per curve A. However, after this interval the drying rate in successive hours dropped markedly so that the meat patty was not finally dried until 24 hours had elapsed. Thus, to make this process more economical it would require a multiplicity of drying chambers operated from the same equipment or utilizing the heating and refrigeration equipment at full capacity only during the first hour. Even under these optimized conditions, it has been found that approximately four times the length of time is required to complete the dehydration from that required by the present invention.

The conventional air drying arrangement of curve C represents a drying time of about two hundred and fifty hours after which time approximately 68 grams of water were removed. This drying was accomplished by blowing air at 28 degrees Fahrenheit and at atmospheric pressure. During the first twenty-four hours of drying by this method, only 29 grams of water were evaporated.

Although the dehydration procedure of the present invention has been described at a sub-atmospheric pressure of 38 millimeters of mercury, this pressure was selected as an optimum relative to a desired minimum drying time and the remaining parameters of the system for the freeze drying of the meat patty. The present invention, however, is operative over a range of pressures of between 5 and 150 millimeters of mercury, absolute pressure. When the present invention is employed for drying other products, other pressures within this range may be found to be more desirable. To this end, it has also been determined that within this range of pressures that the drying cycle can be minimized or is most efficient when the pressure is between 20 and 80 millimeters of mercury. The ranges of temperatures for drying products with the present invention at the aforementioned pressures for the drying gas is in the range of 20–150 degrees Fahrenheit, while maintained at velocities of 1,000–6,000 feet per minute, 4,000 feet per minute being optimum.

It should now be apparent to those skilled in the art that the present invention has advanced the state of the art through the disclosure of an improved freeze drying procedure that is more economical to implement and provides a uniformly and completely dehydrated product that may be readily rehydrated and is commercially acceptable.

What is claimed is:

1. A method of dehydrating a heat sensitive product including the steps of controllably freezing a product to be dried to produce ic crystals of a size for defining capillaries throughout the product when the ice crystals are sublimed, subjecting the thus frozen product to an inert, dry gas of a preselected temperature and velocity and maintained at a preselected sub-atmospheric pressure to produce a balance between the heat transfer rate and the diffusion rate whereby the ice crystals are sublimed while simultaneously preserving the capillaries defined by the ice crystals and simultaneously carrying away the vaporized fluids from the surface of the product.

2. A method of dehydration as defined in claim 1 wherein the inert, dry gas is hydrogen and the product undergoing drying receives its heat essentially solely from the hydrogen gas without allowing the product to thaw.

3. A method of dehydrating a heat sensitive product including the steps of providing a drying chamber having a refrigeration section, a heat exchange section, a product storage section and means to continuously recirculate a gas introduced into the chamber through the sections, introducing a product to be dried into the chamber and storing it in the product storage section thereof, introducing an inert gas into the drying chamber and maintaining it at a preselected sub-atmospheric pressure, cooling the gas to a temperature to cause the product to be dried to freeze and produce ice crystals throughout for defining capillaries upon sublimation of the ice crystals, recirculating the cooled gas through the three sections until the product to be dried is frozen, after the product is frozen, heating the gas in said heat exchange section to a preselected temperature for freeze drying the product, subjecting the product to be dried to the heated, dry gas to sublime the ice crystals and dehydrate the product while preserving the thus defined capillaries, and continuously recirculating the gas through said sections until the product is dried.

4. A method of dehydrating a heat sensitive product as defined in claim 3 wherein the drying gas is maintained as a sub-atmospheric absolute pressure in the range of 5–150 millimeters of mercury, a temperature in the range of 20 to 150 degrees Fahrenheit, and a velocity in the range of 1000 to 6000 feet per minute.

5. A method of dehydration as defined in claim 4 wherein the drying gas is hydrogen.

6. A method of dehydrating a heat sensitive product including the steps of providing a drying chamber having a refrigeration section, a heat exchange section, a product storage section and means to continuously recirculate a gas introduced into the chamber through the sections, introducing a product to be dried into the chamber and storing it in the product storage section thereof, introducing an inert gas into the drying chamber and maintaining it at a preselected sub-atmospheric pressure, cooling the gas to a temperature to cause the product to be dried to freeze, recirculating the cooled gas through the three sections until the product to be dried is frozen, after the product is frozen, heating the gas in said heat exchange section to a preselected temperature for freeze drying the product, subjecting the product to be dried to the heated, dry gas to dehydrate the product, and continuously recirculating the gas through said sections until the product is dried.

7. A method of dehydrating a heat sensitive product as defined in claim 6 wherein the gas temperature is controlled during the drying cycle to maintain a preselected internal temperature for the product.

8. A method of dehydrating a heat sensitive product including the steps of providing a drying chamber having a refrigeration section, a heat exchange section, a product storage section and means to continuously recirculate a gas introduced into the chamber through the sections, introducing a product to be dried into the chamber and storing it in the product storage section thereof, introducing an inert freezing gas into the drying chamber, cooling the gas to a temperature to cause the product to be dried to freeze, recirculating the cooled gas through the three sections until the product to be dried is frozen, evacuating the freezing gas, introducing an inert drying gas that is essentially oxygen free into the chamber and maintaining the drying gas at a preselected sub-atmospheric pressure, freezing the drying gas in said refrigeration section to remove substantially all of the moisture therefrom, heating the inert, dry, drying gas in said heat exchange section, and subjecting the product to be dried to the heated, dry, drying gas to freeze dry the product, and continuously recirculating the drying gas through said sections until the product is uniformly dried throughout without allowing the product to thaw.

9. A method of dehydrating a heat sensitive product as defined in claim 8 wherein the freezing gas is nitrogen and the drying gas is hydrogen.

10. A method of dehydration as defined in claim 8 wherein the product to be dried is stored within the drying chamber to be dried essentially only from the heat provided by the drying gas.

11. A method of dehydrating as defined in claim 8 including controlling the temperature of the drying gas to maintain a preselected internal temperature for the product undergoing drying.

12. A method of dehydrating as defined in claim 11 including monitoring the internal temperature of the product undergoing drying.

13. A method of dehydrating a heat sensitive product including the steps of controllably freezing a product to be dried to produce ice crystals of a size for defining capillaries throughout the product when the ice crystals are sublimed, subjecting the thus frozen product to dry hydrogen at an absolute pressure between 5 and 150 millimeters of mercury, a temperature between 20 and 150 degees Fahrenheit and a velocity between 1000 and 6000 feet per minute so that absolute pressure, temperature and velocity are adjusted to produce a balance between th heat transfer from the hydrogen gas to the product and the mass transfer of water from the product to the hydrogen whereby the ice crystals are sublimed at a temperature which does not exceed 27 degrees Fahrenheit, while simultaneously preserving the capillaries defined by the ice crystals and simultaneously carrying away the vaporized fluids from the surface of the product.

14. A method of dehydrating a heat sensitive food product as defined in claim 13 wherein the product is insulated by materials having a low coefficient of heat transfer so that it receives substantially no heat either by radiation or by conduction from any source except the dry hydrogen.

15. A method of freeze drying a product comprising the steps of freezing the product to be dried, subjecting the frozen product to be dried to a dry, inert gas heated to a temperature to supply the heat of the sublimation of the fluid in the product to be dried, said gas being conveyed over the product and maintained at a velocity of approximately 4,000 feet per minute and at a sub-atmospheric pressure in the range of 20 to 80 millimeters of mercury to simultaneously carry away the vaporized fluid from the surface of the product.

16. A method of freeze drying as defined in claim 15 wherein the drying gas is hydrogen.

17. A method of dehydrating a heat sensitive product including the steps of controllably freezing a product to be dried to produce ice crystals of a size for defining capillaries throughout the product when the ice crystals are sublimed, subjecting the thus frozen product to dry hydrogen gas maintained at an absolute sub-atmospheric pressure between 5 and 150 millimeters of mercury, a temperature of between 20 and 150 degrees Fahrenheit and a velocity between 1,000 and 6,000 feet per minute to produce a balance between the heat transfer rate and the diffusion rate whereby the ice crystals are sublimed while simultaneously preserving the capillaries defined by the ice crystals and simultaneously carrying away the vaporized fluids from the surface of the product, and maintaining the internal temperature of the product undergoing drying to a preselected maximum temperature until a preselected quantity of moisture remains in the product.

18. A method of dehydrating a heat sensitive product including the steps of providing a drying chamber having a heat exchange section, a product storage section and means to constantly recirculate a gas introduced into the chamber through the sections, introducing a frozen product to be dried into the chamber and storing it in the product storage section thereof, introducing hydrogen gas into the drying chamber and maintaining it at a sub-atmospheric pressure in the range of 5 to 150 millimeters of mercury at a temperature in the range of 20 to 150 degrees Fahrenheit for freeze drying the product, subjecting the product to be dried to the heated dry hydrogen gas to sublime the ice crystals and dehydrate the product while preserving the thus defined capillaries and continuously recirculating the gas through said sections until the product is dried.

19. A method of dehydrating a heat sensitive product as defined in claim 18 wherein the gas temperature is controlled to maintain a preselected internal temperature for the product.

20. A method of dehydrating a heat sensitive product as defined in claim 19 wherein the internal temperature of the product is maintained a preselected maximum temperature until a preselected amount of liquid remains in the product.

References Cited

UNITED STATES PATENTS

| | | | |
|---|---|---|---|
| 2,435,503 | 2/1948 | Levinson | 34—5 |
| 3,132,930 | 5/1964 | Abbott | 34—5 |
| 3,178,829 | 4/1965 | Cox | 34—5 |
| 3,218,728 | 11/1965 | Barth | 34—5 |
| 3,233,333 | 2/1966 | Oppenheimer | 34—5 |
| 3,255,534 | 6/1966 | Kan | 34—5 |
| 3,259,991 | 7/1966 | Illich | 34—5 |
| 3,262,212 | 7/1966 | De Buhr | 34—5 |
| 3,263,335 | 8/1966 | Kan | 34—5 |
| 3,271,873 | 9/1966 | Harper | 34—5 |
| 3,299,525 | 1/1967 | Thuse | 34—5 |
| 3,309,779 | 3/1967 | Ginnette | 34—5 |

WILLIAM J. WYE, Primary Examiner

U.S. Cl. X.R.

34—92; 99—208

PO-1050
(5/69)

UNITED STATES PATENT OFFICE
CERTIFICATE OF CORRECTION

Patent No. 3,487,554      Dated Feb. 27, 1970

Inventor(s) George Tooby

It is certified that error appears in the above-identified patent and that said Letters Patent are hereby corrected as shown below:

Correct inventor's address to read: "1355 Circle Drive".

Column 1, line 48, change "om-" to --com---.

Column 2, line 62, change "ony" to --only--.

Column 3, line 11, cancel "and passed thereover at a velocity to cause the sublima-" and add --undergoing drying with a minimum of contact and--.

Column 6, line 8, cancel "trays storing the product undergoing drying are con-" and add --tray is constructed by conduction to the article or--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents